US012597566B2

(12) United States Patent
Lee et al.

(10) Patent No.: US 12,597,566 B2
(45) Date of Patent: Apr. 7, 2026

(54) MULTILAYER ELECTRONIC COMPONENT

(71) Applicant: SAMSUNG ELECTRO-MECHANICS CO., LTD., Suwon-si (KR)

(72) Inventors: Yoo Jeong Lee, Suwon-si (KR); Kwang Yeun Won, Suwon-si (KR); Hyung Jong Choi, Suwon-si (KR); So Jung An, Suwon-si (KR); Jung Won Park, Suwon-si (KR); Woo Kyung Sung, Suwon-si (KR); Byung Jun Jeon, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 214 days.

(21) Appl. No.: 18/372,870

(22) Filed: Sep. 26, 2023

(65) Prior Publication Data

US 2024/0222030 A1 Jul. 4, 2024

(30) Foreign Application Priority Data

Dec. 30, 2022 (KR) ........................ 10-2022-0190746

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/12* (2013.01)

(58) Field of Classification Search
CPC .......... H01G 4/30; H01G 4/008; H01G 4/012; H01G 4/12; H01G 4/228; H01G 4/232; H01G 4/248; H01G 2/065; H01G 4/1227
(Continued)

(56) References Cited

U.S. PATENT DOCUMENTS

2008/0118721 A1 5/2008 Horie et al.
2013/0258546 A1 10/2013 Kim et al.
(Continued)

FOREIGN PATENT DOCUMENTS

JP 2013-110239 A 6/2013
JP 2021-019008 A 2/2021
JP 2021-068851 A 4/2021

OTHER PUBLICATIONS

Extended European Search Report dated Dec. 18, 2024 issued in the corresponding European Patent Application No. 23201804.4.

*Primary Examiner* — Arun Ramaswamy
(74) *Attorney, Agent, or Firm* — Morgan, Lewis & Bockius LLP

(57) ABSTRACT

A multilayer electronic component includes: a body including a dielectric layer and internal electrodes alternately positioned while having the dielectric layer interposed therebetween; and an external electrode positioned on the body. The external electrode includes an electrode layer connected to one or more of the internal electrodes and including copper (Cu), a first plating layer positioned on the electrode layer and including nickel (Ni), and a second plating layer positioned on the first plating layer and including nickel (Ni). An oxide including nickel (Ni) is positioned on a boundary surface between the first plating layer and the second plating layer. An average thickness of the first plating layer is smaller than an average thickness of the second plating layer.

24 Claims, 6 Drawing Sheets

A

(51) Int. Cl.
*H01G 4/012* (2006.01)
*H01G 4/12* (2006.01)

(58) Field of Classification Search
USPC .......... 361/301.1, 301.4, 321.1, 321.3, 306.3
See application file for complete search history.

(56) References Cited

U.S. PATENT DOCUMENTS

| | | | | |
|---|---|---|---|---|
| 2020/0006001 | A1 | 1/2020 | Lee et al. | |
| 2021/0020368 | A1* | 1/2021 | Yoshino ................. | H01G 4/232 |
| 2021/0020370 | A1 | 1/2021 | Yoshina et al. | |
| 2021/0125780 | A1 | 4/2021 | Hayashi et al. | |
| 2021/0366657 | A1 | 11/2021 | Sakai | |

* cited by examiner

MULTILAYER ELECTRONIC COMPONENT

CROSS-REFERENCE TO RELATED APPLICATION (S)

This application claims benefit of priority to Korean Patent Application No. 10-2022-0190746 filed on Dec. 30, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, may be a chip-type condenser which is mounted on a printed circuit board of various electronic products, such as an imaging device such as a liquid crystal display (LCD) or a plasma display panel (PDP), a computer, a smartphone or a cellular phone, to charge or discharge electricity therein or therefrom.

A plating layer may be formed on an external electrode of the multilayer ceramic capacitor to protect the multilayer ceramic capacitor from an external environment and secure electrical connectivity with a circuit. Hydrogen may occur in a process of forming the plating layer on the external electrode and permeate into the external electrode to thus be diffused into an internal electrode and a dielectric under high temperature and electric field conditions, and the diffused hydrogen may cause lower reliability of the multilayer ceramic capacitor.

Therefore, there is a need for the external electrode with an improved structure which may secure reliability of the multilayer electronic component even when the plating layer is formed on the external electrode.

SUMMARY

An aspect of the present disclosure may provide a multilayer electronic component which may secure its reliability even when hydrogen permeates into the multilayer electronic component in a process of forming a plating layer on an external electrode.

However, the present disclosure is not limited to the description above, and may be more readily understood in the description of exemplary embodiments of the present disclosure.

According to an aspect of the present disclosure, a multilayer electronic component may include: a body including a dielectric layer and internal electrodes alternately positioned while having the dielectric layer interposed therebetween; and an external electrode positioned on the body. The external electrode may include an electrode layer connected to one or more of the internal electrodes and including copper (Cu), a first plating layer positioned on the electrode layer and including nickel (Ni), and a second plating layer positioned on the first plating layer and including nickel (Ni). An oxide including nickel (Ni) may be positioned on a boundary surface between the first plating layer and the second plating layer. An average thickness of the first plating layer may be smaller than an average thickness of the second plating layer.

According to an aspect of the present disclosure, a multilayer electronic component may include: a body including a dielectric layer and internal electrodes alternately positioned while having the dielectric layer interposed therebetween; and an external electrode positioned on the body. The external electrode may include an electrode layer connected to one or more of the internal electrodes and including copper (Cu), a first plating layer positioned on the electrode layer and including nickel (Ni), and a second plating layer positioned on the first plating layer and including nickel (Ni). An oxide including nickel (Ni) is positioned on a boundary surface between the first plating layer and the second plating layer. An average thickness of the first plating layer is 0.9 μm or less.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
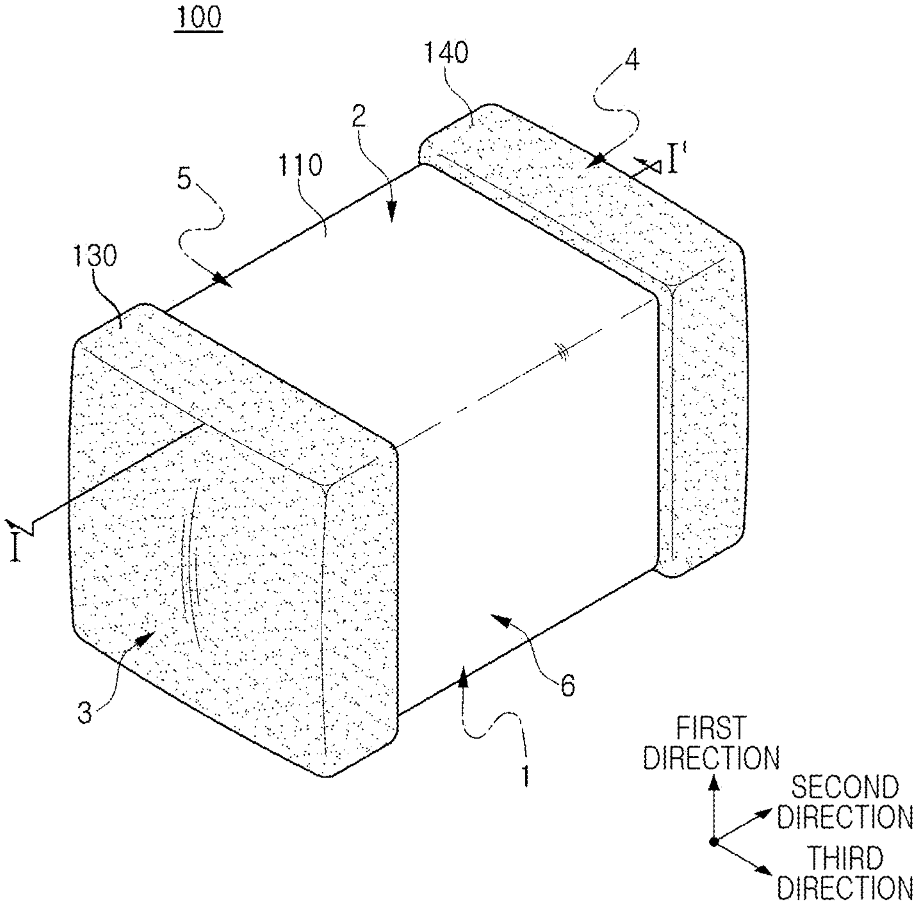
FIG. 1 is a perspective view schematically showing a multilayer electronic component according to an exemplary embodiment of the present disclosure.

Hereinafter, exemplary embodiments of the present disclosure will now be described in detail with reference to the accompanying drawings.

In the drawings, a first direction may be defined as a direction in which first and second internal electrodes are alternately positioned while having a dielectric layer interposed therebetween, or a thickness (T) direction, and a second direction may be defined as a length (L) direction, and a third direction may be defined as a width (W) direction. The second direction and the third direction may be perpendicular to the first direction.

FIG. 1 is a perspective view schematically showing a multilayer electronic component according to an exemplary embodiment of the present disclosure.

Figure 2:
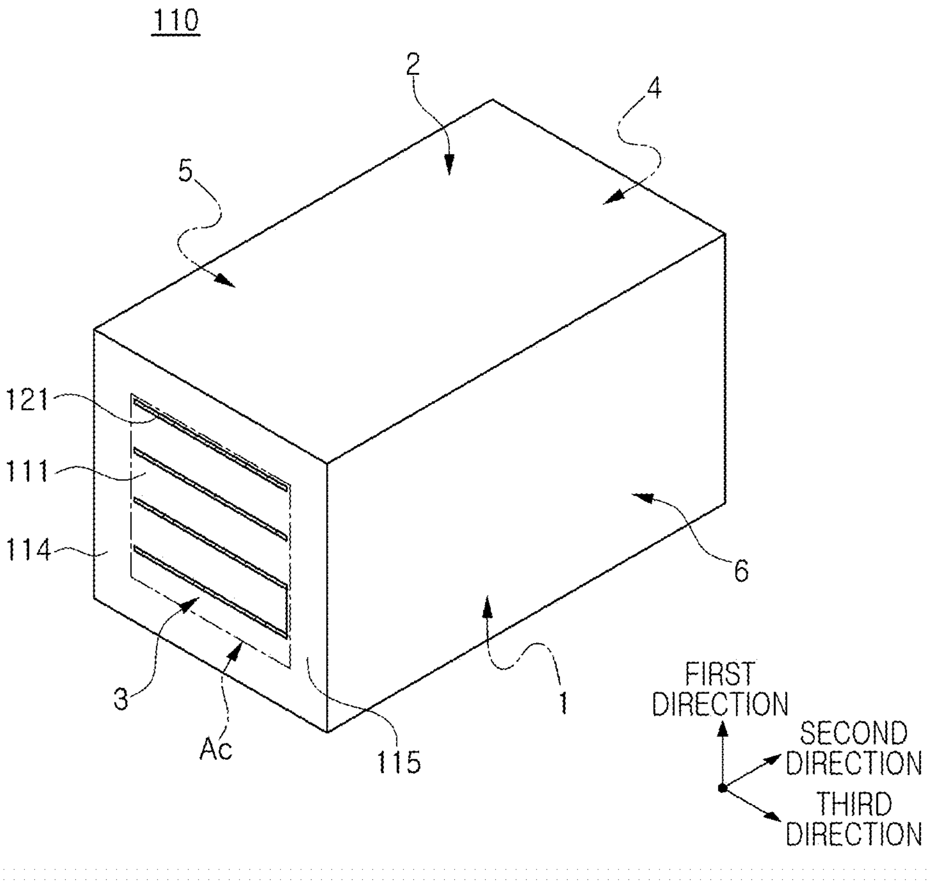
FIG. 2 is a perspective view schematically showing a body according to an exemplary embodiment.

FIG. 2 is a perspective view schematically showing a body according to an exemplary embodiment.

Figure 3:
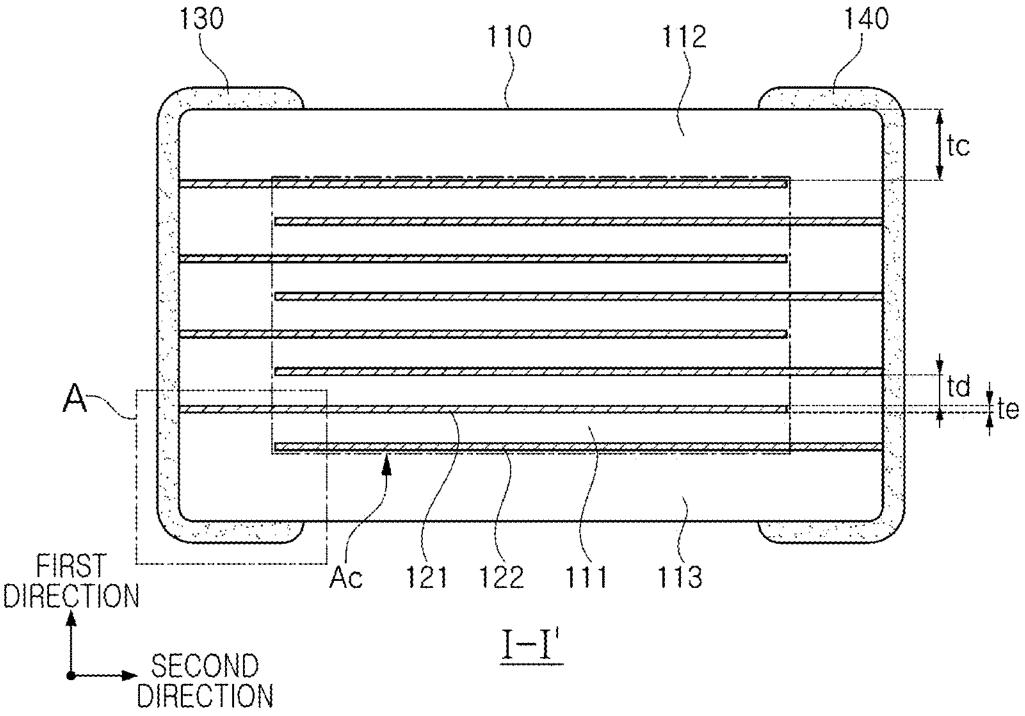
FIG. 3 is a cross-sectional view taken along line I-I' of FIG. 1.

FIG. 3 is a cross-sectional view taken along line I-I' of FIG. 1.

Figure 4:
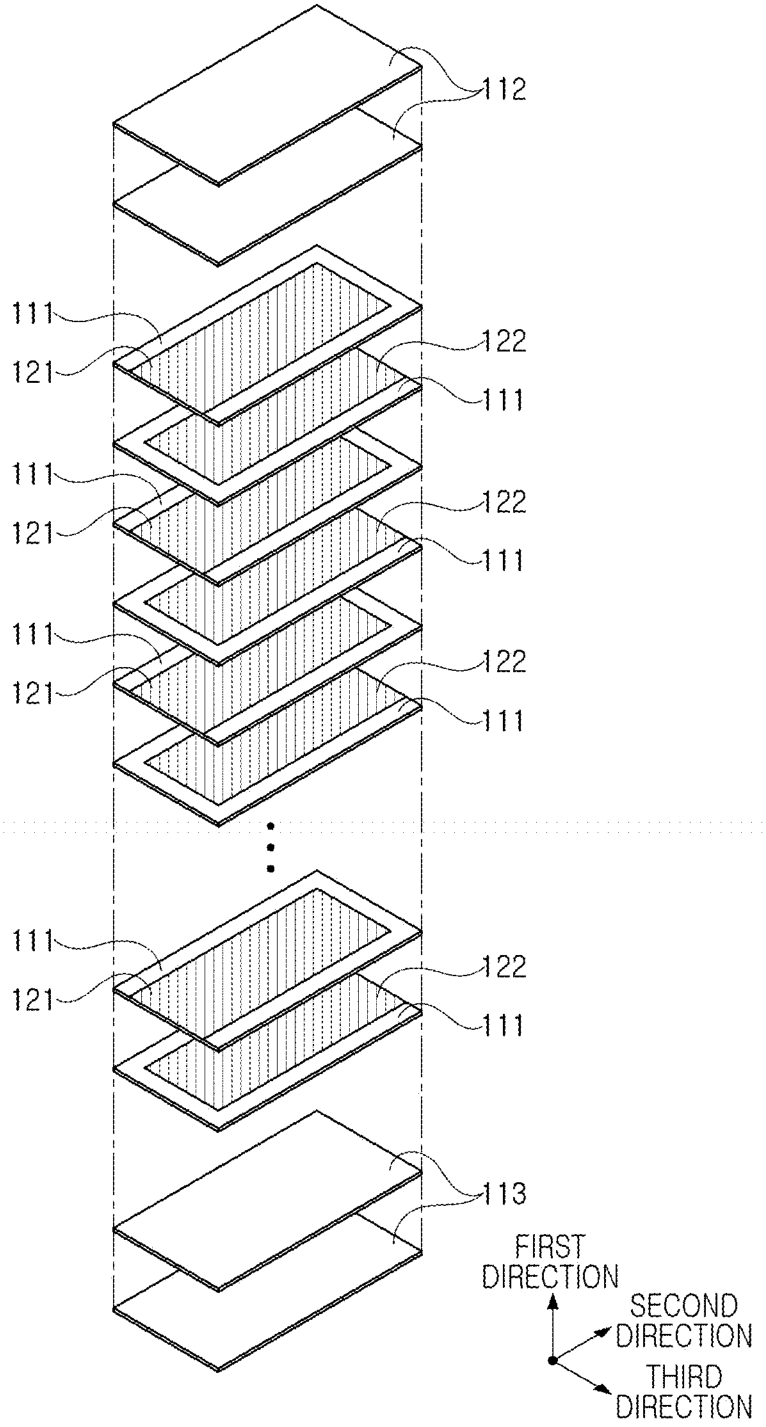
FIG. 4 is an exploded perspective view showing a disassembled body according to an exemplary embodiment.
Figure 5:
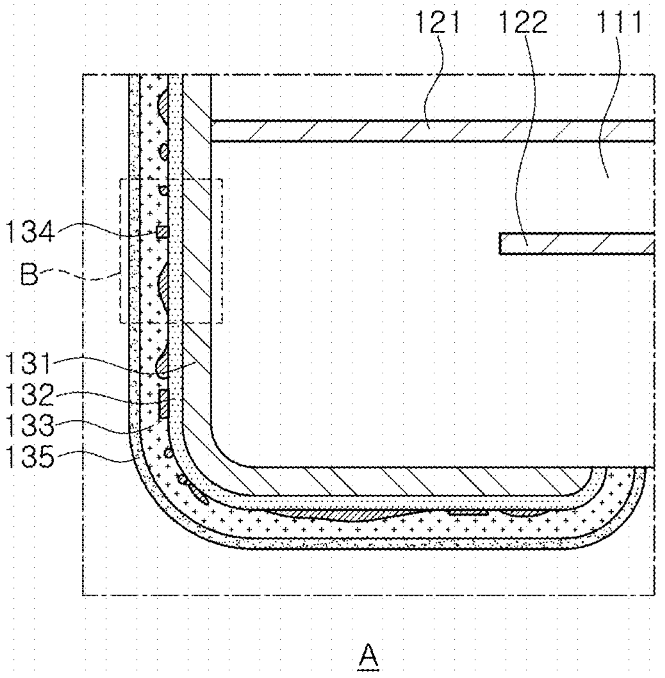
FIG. 5 is an enlarged view of a region A of FIG. 3.

FIG. 4 is an exploded perspective view showing a disassembled body according to an exemplary embodiment. FIG. 5 is an enlarged view of a region A of FIG. 3.

Figure 6:
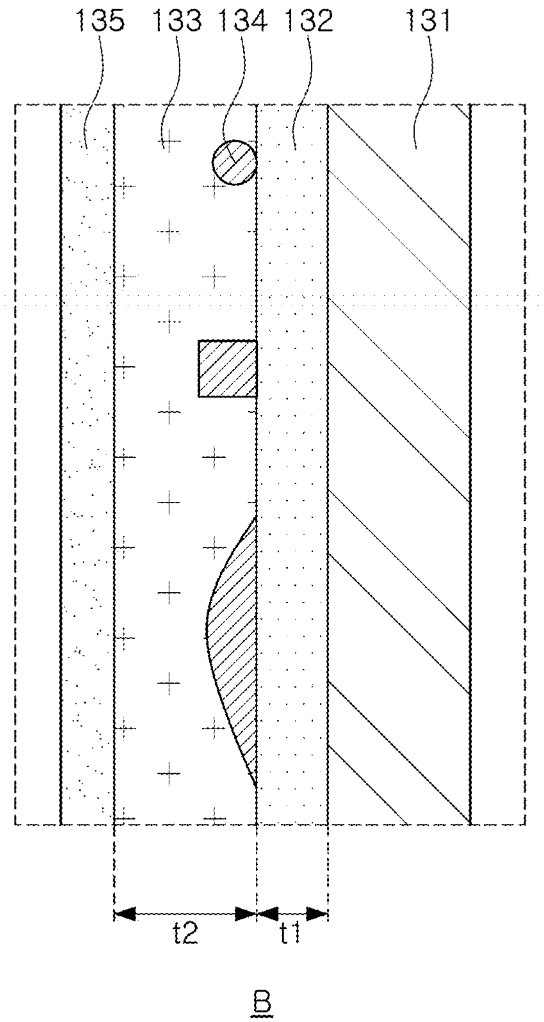
FIG. 6 is an enlarged view of a region B of FIG. 5.

FIG. 6 is an enlarged view of a region B of FIG. 5.

Hereinafter, the description describes a multilayer electronic component 100 according to an exemplary embodiment of the present disclosure in detail with reference to FIGS. 1 through 6.

The multilayer electronic component 100 according to an exemplary embodiment of the present disclosure may include: a body 110 including a dielectric layer 111 and internal electrodes 121 and 122 alternately positioned while having the dielectric layer 111 interposed therebetween; and external electrodes 130 and 140 positioned on the body 110.

The external electrode 130 or 140 includes an electrode layer 131 connected to the internal electrode 121 or 122 and including copper (Cu), a first plating layer 132 positioned on the electrode layer 131 and including nickel (Ni), and a second plating layer 133 positioned on the first plating layer 132 and including nickel (Ni). An oxide 134 including nickel (Ni) may be positioned on a boundary surface between the first plating layer 132 and the second plating layer 133, and an average thickness t1 of the first plating layer 132 may be smaller than an average thickness t2 of the second plating layer 133.

The body 110 may include the dielectric layer 111 and the internal electrodes 121 and 122 alternately positioned while having the dielectric layer 111 interposed therebetween.

The body 110 is not limited to a particular shape, and may have a hexahedral shape or a shape similar to the hexahedral shape, as shown in the drawings. The body 110 may not have the hexahedral shape having perfectly straight lines due to contraction of ceramic powders included in the body 110 in a sintering process, and have substantially the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 included in the body 110 may be in a sintered state, and adjacent dielectric layers 111 may be integrated with each other so that boundaries therebetween are not readily apparent without using a scanning electron microscope (SEM).

According to an exemplary embodiment of the present disclosure, a raw material of the dielectric layer 111 is not particularly limited as long as sufficient capacitance is obtained from the raw material. For example, the dielectric layer 111 may use a material such as a barium titanate-based material, a lead composite perovskite-based material, a strontium titanate-based material, or the like. The barium titanate-based material may include barium titanate ($BaTiO_3$)-based ceramic powders, and the ceramic powders may be, for example, $BaTiO_3$ or $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1), in which calcium (Ca), zirconium (Zr) or the like is partially dissolved in $BaTiO_3$.

In addition, the raw material of the dielectric layer 111 may be prepared by adding various ceramic additives, organic solvents, binders, dispersing agents and the like, to the powders such as the barium titanate ($BaTiO_3$) powders, based on an object of the present disclosure.

Meanwhile, an average thickness td of the dielectric layer 111 may not need to be particularly limited. For example, the average thickness td of the dielectric layer 111 may be 0.2 μm or more and 2 μm or less, and the average thickness td of the dielectric layer 111 may be 0.35 μm or less to more easily achieve high capacity and smaller size of the multilayer electronic component 100.

Here, the thickness td of the dielectric layer 111 may indicate the thickness td of the dielectric layer 111 disposed between the first and second internal electrodes 121 and 122.

The average thickness td of the dielectric layer 111 may be measured by scanning an image of a cross section of the body 110 in a length-thickness (L-T) direction by using the scanning electron microscope (SEM) with a magnification of 10,000. In more detail, an average thickness value of the dielectric layer may be measured by measuring a thickness of one dielectric layer at thirty equally spaced points in the length direction in the scanned image. The thirty equally spaced points may be designated in the capacitance formation part Ac. In addition, it is possible to obtain the more general average thickness of the dielectric layer when measuring its average value by extending a measurement target of the average value to ten dielectric layers.

The body 110 may include the capacitance formation part Ac positioned in the body 110, forming a capacitance by including the first and second internal electrodes 121 and 122 alternately positioned while having the dielectric layer 111 interposed therebetween, and cover parts 112 and 113 respectively positioned on the upper and lower surfaces of the capacitance formation part Ac in the first direction.

In addition, the capacitance formation part Ac may be a part that contributes to forming the capacitance of the capacitor, and formed by repeatedly stacking the plurality of first and second internal electrodes 121 and 122 on each other while having the dielectric layer 111 interposed therebetween.

In an exemplary embodiment, the upper cover part 112 may be disposed on one surface of the capacitance formation part Ac in the first direction, and the lower cover part 113 may be disposed on the other surface of the capacitance formation part Ac in the first direction.

The upper cover part 112 and the lower cover part 113 may respectively be formed by stacking one dielectric layer or two or more dielectric layers on the upper and lower surfaces of the capacitance formation part Ac in the thickness direction, and may basically prevent the internal electrodes from being damaged due to physical or chemical stress.

The upper or lower cover part 112 or 113 may include no internal electrode and include the same material as the dielectric layer 111.

That is, the upper or lower cover part 112 or 113 may include a ceramic material and include, for example, a barium titanate ($BaTiO_3$)-based ceramic material.

Meanwhile, an average thickness of the cover part 112 or 113 may not need to be particularly limited. However, 15 μm or less may be an average thickness tc of the cover part 112 or 113 in order for the multilayer electronic component to more easily have the smaller size and the higher capacitance.

The average thickness of the cover part 112 or 113 may indicate its size in the first direction, and may have a value obtained by averaging the sizes of the cover part 112 or 113 in the first direction, measured at five equally spaced points on upper or lower surface of the capacitance formation part Ac.

In an exemplary embodiment, a marginal part 114 or 115 may be positioned on one surface or the other surface of the capacitance formation part Ac in the third direction.

Referring to FIG. 2, the marginal part 114 or 115 may include the marginal part 114 positioned on the fifth surface 5 of the body 110 or the marginal part 115 positioned on the sixth surface 6 of the body 110. That is, the marginal part 114 or 115 may be disposed on each of end surfaces of the body 110 in the third direction (or width direction).

As shown in FIG. 2, the marginal part 114 or 115 may indicate a region between each of two ends of the first or second internal electrode 121 or 122 and a boundary surface of the body 110.

The marginal part 114 or 115 may basically prevent the internal electrode from being damaged due to the physical or chemical stress.

The marginal part 114 or 115 may be formed by forming the internal electrode by applying a conductive paste on a ceramic green sheet except for its portion where the marginal part is to be formed.

In addition, in order to suppress a step difference occurring due to the internal electrode 121 or 122, the marginal part 114 or 115 may be formed by stacking the internal electrodes on each other, then cutting the internal electrodes to be exposed to the fifth and sixth surfaces 5 and 6 of the body, and then stacking one dielectric layer or two or more dielectric layers on each of two side surfaces of the capacitance formation part Ac in the third direction (or width direction).

Meanwhile, a width of the marginal part 114 or 115 may not need to be particularly limited. However, 15 μm or less may be the average width of the marginal part 114 or 115 in order for the multilayer electronic component to more easily have the smaller size and the higher capacitance.

The average width of the marginal part 114 or 115 may indicate its size in the third direction, and may have a value obtained by averaging the sizes of the marginal part 114 or 115 in the third direction, measured at five equally spaced points on the side surface of the capacitance formation part Ac.

The internal electrodes 121 and 122 may be alternately positioned in the first direction while having the dielectric layer 111 therebetween.

The internal electrode 121 or 122 may be the first internal electrode 121 or the second internal electrode 122. The first and second internal electrodes 121 and 122 may be alternately disposed to oppose each other while having the dielectric layer 111 included in the body 110 interposed therebetween, and may respectively be connected to the third and fourth surfaces 3 and 4 of the body 110. In detail, one end of the first internal electrode 121 may be connected to the third surface 3, and one end of the second internal electrode 122 may be connected to the fourth surface 4. That is, in an exemplary embodiment, the internal electrode 121 or 122 may be in contact with the third surface 3 or the fourth surface 4.

As shown in FIG. 3, the first internal electrode 121 may be spaced apart from the fourth surface 4 and exposed through the third surface 3, and the second internal electrode 122 may be spaced apart from the third surface 3 and exposed through the fourth surface 4. The first external electrode 130 may be disposed on the third surface 3 of the body to be connected to the first internal electrode 121, and the second external electrode 140 may be disposed on the fourth surface 4 of the body to be connected to the internal electrode 122.

That is, the first internal electrode 121 may not be connected to the second external electrode 140 and may be connected to the first external electrode 130, and the second internal electrode 122 may not be connected to the first external electrode 130 and may be connected to the second external electrode 140. Accordingly, the first internal electrode 121 may be spaced apart from the fourth surface 4 by a predetermined distance, and the second internal electrode 122 may be spaced apart from the third surface 3 by the predetermined distance. Here, the first and second internal electrodes 121 and 122 may be electrically isolated from each other by the dielectric layer 111 interposed therebetween.

Referring to FIG. 4, the body 110 may be formed by alternately stacking the ceramic green sheet on which the first internal electrode 121 is printed and the ceramic green sheet on which the second internal electrode 122 is printed on each other and then sintering the same.

A material of the internal electrode 121 or 122 is not particularly limited, and may use a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti), and an alloy thereof.

In addition, the internal electrode 121 or 122 may be formed by printing, on the ceramic green sheet, the conductive paste for an internal electrode including at least one of nickel (Ni), copper (Cu), palladium (Pd), silver (Ag), gold (Au), platinum (Pt), tin (Sn), tungsten (W), titanium (Ti), and an alloy thereof. A method of printing the conductive paste for an internal electrode may be a screen printing method, a gravure printing method or the like, and the present disclosure is not limited thereto.

The external electrode 130 or 140 may be positioned on the body 110.

The external electrode 130 or 140 may include the first external electrode 130 in contact with the third surface 3 of the body 110 or a second external electrode 140 in contact with the fourth surface 4 of the body 110.

Hereinafter, the description describes a structure of the external electrode 130 or 140 based on the first external electrode 130. Descriptions of the first external electrode 130 may also be applied to the second external electrode 140.

Referring to FIG. 5, the external electrode 130 may be connected to the internal electrode 121 and include the electrode layer 131 including copper (Cu). The electrode layer 131 may be formed by electrolytic plating, electroless plating, sputtering, spraying, or the like, and also be formed by applying the conductive paste including copper (Cu) and glass to at least one of the third surface 3 and fourth surface 4 of the body 110 and then sintering the same.

The electrode layer 131 may be connected to the internal electrode 121 to ensure electrical conduction. Here, when the internal electrode 121 includes nickel (Ni), a copper (Cu)-nickel (Ni) alloy may be formed on a boundary surface between the electrode layer 131 and the internal electrode 121, thus enhancing adhesion and electrical connectivity thereof.

The first plating layer 132 including nickel (Ni) and the second plating layer 133 including nickel (Ni) may be positioned on the electrode layer 131, and the oxide 134 including nickel (Ni) may be positioned on the boundary surface between the first plating layer 132 and the second plating layer 133.

A prior art suggests a method of performing heat treatment by forming a tin (Sn) plating layer on the nickel (Ni) plating layer and then forming an appropriate hole in the tin (Sn) plating layer to remove hydrogen occurring during the process of forming the plating layer and absorbed in the nickel (Ni) plating layer. However, the tin (Sn) plating layer has a 100 times lower diffusion coefficient for hydrogen than the nickel (Ni) plating layer. Accordingly, there is a limit to removing hydrogen already absorbed in the nickel (Ni) plating layer, and solderability of the multilayer electronic component may be deteriorated in the case of forming such a separate hole in the tin (Sn) plating layer. In addition, in the case of forming the nickel (Ni) plating layer on the electrode layer 131, more hydrogen may occur than in the case of forming the tin (Sn) plating layer. Therefore, it may be difficult to effectively remove hydrogen permeating into the electrode layer 131 or the body 110 in the process of forming the nickel (Ni) plating layer.

Accordingly, in the present disclosure, the first plating layer 132 including relatively thin nickel (Ni) may be formed, vacuum heat treatment may be performed thereon at a temperature of 180 to 250° C. for 24 hours, and the second plating layer 133 including nickel (Ni) may then be formed to thus more effectively remove hydrogen permeating into the body 110, thereby improving reliability of the multilayer electronic component 100.

The oxide 134 including nickel (Ni) may be formed in a process of forming the second plating layer 133 including nickel (Ni) after forming the first plating layer 132 and then performing the vacuum heat treatment thereon at the temperature of 180 to 250° C. for 24 hours. However, the oxide 134 may not necessarily have to be formed through this process, and may be formed by a method of proceeding with oxidation treatment under separate conditions after forming the electrode layer 131.

There is no particular limit to a method of confirming that the oxide 134 including nickel (Ni) is positioned on the boundary surface between the first plating layer 132 and the second plating layer 133. For example, the confirmation may be performed by polishing the multilayer electronic component 100 to its center in the third direction to expose the cross sections in the first and second directions, and then measuring the type and content of the element in the first plating layer 132, the second plating layer 133, and the boundary surface between the first plating layer 132 and the second plating layer 133 through a scanning electron microscope energy dispersive x-ray spectroscopy (SEM-EDX) method. Here, the boundary surface between the first plating layer 132 and the second plating layer 133 may be a boundary at which a difference in grain sizes of adjacent grains is greatest, as described below.

Meanwhile, in the present disclosure, the first plating layer 132 may be formed using electrolytic plating, is not limited thereto, and may also be formed by wet plating such as electroless plating or dry plating such as sputtering or deposition. These plating methods may also be applied to the second plating layer 133 and a third plating layer 135 to be described below.

As shown in FIG. 6, the average thickness t1 of the first plating layer 132 in an exemplary embodiment of the present disclosure may be smaller than the average thickness t2 of the second plating layer 133. When the average thickness t1 of the first plating layer is greater than the average thickness t2 of the second plating layer, a proportion of the first plating layer in the total nickel (Ni) plating layer may be excessive. Therefore, even when the heat treatment is performed thereon, hydrogen permeating into the body 110 or the electrode layer 131 may be highly likely to be absorbed in the first plating layer 132 without being externally released. Therefore, in an exemplary embodiment of the present disclosure, it is possible to more effectively remove hydrogen permeating in the body 110 by making the average thickness t1 of the first plating layer 132 smaller than the average thickness t2 of the second plating layer 133, thereby improving the reliability of the multilayer electronic component 100.

There is no particular limit to a method of measuring the average thickness t1 of the first plating layer 132 and the average thickness of the second plating layer 133. The average thickness t1 or t2 of the first or second plating layer may be a value obtained by dividing a region of the first or second plating layer 132 or 133 that is positioned on the third surface into three parts, i.e. an upper layer, a center, and a lower layer, in the first direction, and then averaging the sizes of the first or second plating layer 132 or 133 in the second direction, respectively measured in the upper, center, and lower layers. The average thickness t1 or t2 of the first or second plating layer may be measured by polishing the multilayer electronic component 100 to its center in the third direction to expose the cross sections in the first and second directions, and then using an image program or the like for an image of the first external electrode 130 observed with the scanning electron microscope (SEM) or an optical microscope (OP).

In an exemplary embodiment, the oxides 134 each including nickel (Ni) may be positioned in an island shape. The oxides 134 each including nickel (Ni) and positioned in the island shape may serve as anchors for the second plating layer 133, thus improving adhesion between the first plating layer 132 and the second plating layer 133. However, the oxides 134 including nickel (Ni) and positioned on the boundary surface between the first and second plating layers 132 and 133 may form various shapes. For another example, the oxides 134 each including nickel (Ni) may be positioned in a scattered point shape on the boundary surface between the first plating layer 132 and the second plating layer 133 to thus increase a surface area on which the second plating layer 133 is formed, thereby further improving the adhesion of the first plating layer 132 to the second plating layer 133.

The "island shape" may indicate that oxides each including nickel (Ni) are spaced apart from each other at random intervals, and indicate that the oxide is positioned to cover only a portion of the first plating layer 132 and not cover another portion thereof. In addition, the "scattered point shape" may indicate that the oxides each including nickel (Ni) and having a shape of particles or grains are scattered on the first plating layer 132.

In an exemplary embodiment, the first plating layer 132 may cover the electrode layer 131. The first plating layer 132 may include nickel (Ni), thus improving a sealing characteristic of the multilayer electronic component 100. As in this exemplary embodiment, the first plating layer 132 covering the electrode layer 131 may more effectively protect the inside of the multilayer electronic component 100 from an external environment.

In an exemplary embodiment, a sum of the average thickness t1 of the first plating layer 132 and the average thickness t2 of the second plating layer 133 may be 2 μm or more. The reason is that insufficient coverage or disconnection of the nickel (Ni) plating layer may occur when the sum of the average thickness t1 of the first plating layer 132 and the average thickness t2 of the second plating layer 133 is less than 2 μm.

Meanwhile, the sum of the average thickness t1 of the first plating layer 132 and the average thickness t2 of the second plating layer 133 may be 10 μm or less. Cracks may occur in the body 110 of the first or second plating layer 132 or 133 due to increased stress applied thereto when the sum of the average thickness t1 of the first plating layer 132 and the average thickness t2 of the second plating layer 133 is greater than 10 μm.

In an exemplary embodiment, the average thickness t1 of the first plating layer 132 may be 0.1 μm or more and 0.9 μm or less. When the average thickness t1 of the first plating layer 132 is greater than 0.9 μm, hydrogen permeating into the body 110 or the electrode layer 131 may be poorly removed even through the heat treatment performed after the first plating layer 132 is formed. On the other hand, when the average thickness t1 of the first plating layer 132 is less than 0.1 μm, there is a possibility that excessive hydrogen occurs as an exposed area of copper (Cu) is increased while the second plating layer 133 is formed, and then permeates into the body 110. Accordingly, the sealing characteristic of the multilayer electronic component 100 may be somewhat insufficiently improved. Therefore, it is possible to secure the sealing characteristic, high-temperature reliability and moisture resistance reliability of the multilayer electronic component 100 by adjusting the average thickness t1 of the first plating layer 132 to 0.1 μm or more and 0.9 μm or less, as in an exemplary embodiment of the present disclosure.

In an exemplary embodiment, a ratio of the average thickness t1 of the first plating layer 132 to the average thickness t2 of the second plating layer 133 may be 0.9 or less. In this manner, it is possible to effectively remove hydrogen permeating into the body 110 or the electrode layer 131 through the heat treatment performed after the first plating layer 132 is formed, and to improve the high temperature reliability and moisture resistance reliability of the multilayer electronic component 100.

In an exemplary embodiment, the first or second plating layer 132 or 133 may include the plurality of grains. The first plating layer 132 may be formed on the electrode layer 131 including copper (Cu), whereas the second plating layer 133 may be formed on the first plating layer 132 including nickel (Ni). Therefore, an average grain size of the plurality of grains included in the second plating layer 133 may be greater than an average grain size of the plurality of grains included in the first plating layer 132. In addition, the difference in the grain size of the plurality of grains may be greatest at the boundary between the first plating layer 132 and the second plating layer 133, and the boundary at which a difference in grain sizes of adjacent grains is greatest may be the boundary surface between the first plating layer 132 and the second plating layer.

There is no particular limit to a method of measuring the average grain size of the plurality of grains included in the first and second plating layers 132 and 133. For example, the multilayer electronic component 100 may be polished to its center in the third direction to expose the cross sections in the first and second directions, and the first external electrode 130 may then be observed using the scanning electron microscope (SEM) or the optical microscope (OM). The measurement may be performed at a center of a region in the first direction of the first plating layer 132 or the second plating layer 133, positioned on the third surface 3 of the body 110. In detail, each average grain size of the grains in the first plating layer 132 and the second plating layer 133 may be obtained by measuring a total length of 10 or more adjacent grains at each center of the first plating layer 132 and the second plating layer 133, and then dividing the measured total length by the number of the grains.

In an exemplary embodiment, the oxide 134 including nickel (Ni) may include nickel oxide such as NiO or $Ni_2O_3$, and may include nickel hydroxide such as Ni $(OH)_2$. However, in an exemplary embodiment, the second plating layer 133 including nickel (Ni) may be positioned on the oxide 134 including nickel (Ni), and the heat treatment for removing hydrogen may proceed after the first plating layer 132 is formed. Therefore, the oxide 134 including nickel (Ni) may be NiO.

In an exemplary embodiment, the electrode layer 131 may further include glass. The electrode layer 131 is a component positioned on the third surface 3 or the fourth surface 4 of the body 110, and may be in contact with one surface of the body 110. When including only the conductive metal, the electrode layer 131 may be difficult to secure adhesion with the body 110 that uses a dielectric ceramic as its main element. As in an exemplary embodiment, when further including glass in addition to the conductive metal, the electrode layer 131 may improve adhesion between the body 110 and the external electrode 130.

Meanwhile, in an exemplary embodiment the first plating layer 132 or the second plating layer 133 may be the plating layer substantially including only nickel (Ni) without including glass, thus improving the sealing characteristic of the multilayer electronic component 100.

In an exemplary embodiment, the external electrode 130 further may include the third plating layer 135 positioned on the second plating layer 133 and including tin (Sn). The third plating layer 135 may secure mountability of the multilayer electronic component, and may be the plating layer substantially include only tin (Sn) without including glass. A method of forming the third plating layer 135 is not particularly limited.

In an exemplary embodiment, the third plating layer 135 may cover the second plating layer 133. The prior art suggests the method of performing the heat treatment by forming the tin (Sn) plating layer on the nickel (Ni) plating layer and then forming an appropriate hole in the tin (Sn) plating layer to remove hydrogen occurring during the process of forming the plating layer and absorbed in the nickel (Ni) plating layer. The tin (Sn) plating layer formed according to the prior art may not cover the nickel (Ni) plating layer. A region of the nickel (Ni) plating layer that is not covered by the tin (Sn) plating layer may deteriorate the solderability of the multilayer electronic component when the multilayer electronic component 100 is mounted on a board. As in an exemplary embodiment, when the third plating layer 135 including tin (Sn) covers the second plating layer 133 including nickel (Ni), the third plating layer 135 may include no opening, thus preventing deteriorated solderability of the multilayer electronic component when the multilayer electronic component 100 is mounted on the board. From the same point of view, in an exemplary embodiment, the third plating layer 135 may include no opening, and cover an entire surface of the second plating layer 133.

In an exemplary embodiment, the electrode layer 131 may be a conductive resin layer including copper (Cu) and thermosetting resin. Meanwhile, the electrode layer 131 may further include at least one of nickel (Ni), silver (Ag), tin (Sn), and chromium (Cr) in addition to copper (Cu). In addition, in the electrode layer 131, at least one conductive metal of copper (Cu), nickel (Ni), silver (Ag), tin (Sn), and chromium (Cr) may exist in the form of particles, and is not limited thereto.

The thermosetting resin may include resin having higher heat resistance. For example, the thermosetting resin may include at least one of phenolic resin, urea resin, diallylphthalate resin, melanin resin, guanamine resin, unsaturated polyester resin, polyurethane resin, epoxy resin, acrylic resin, ethyl cellulose resin, aminoalkyd resin, melamine-urea cocondensation resin, silicon resin, and polysiloxane resin, and is not limited thereto. The electrode layer 131 including the thermosetting resin may protect the multilayer electronic component 100 from stress due to warpage and solder reflow that may occur when the multilayer electronic component 100 is mounted on the board.

As in an exemplary embodiment, when the electrode layer 131 is the conductive resin layer including the thermosetting resin, a boundary surface resistance thereof may be greater than that of a sintered electrode including glass. Therefore, it is highly likely that excessive hydrogen occurs in an initial stage of forming the first plating layer 132 on the electrode layer 131 as the plating layer. However, according to an exemplary embodiment of the present disclosure, the external electrode 130 may include the first plating layer 132 positioned on the electrode layer 131 and including nickel (Ni), and the second plating layer 133 positioned on the first plating layer and including nickel (Ni), an oxide 134 including nickel (Ni) may be positioned on the boundary surface between the first plating layer and the second plating layer, and the average thickness t1 of the first plating layer is smaller than the average thickness t2 of the second plating layer, thus minimizing excessive hydrogen occurring due to the electrode layer 131 including the thermosetting resin.

Inventive Example

Table 1 below shows a result by evaluating the number of reliability deterioration occurring in samples of the multilayer electronic components in which the first plating layer has a different thickness based on whether the heat treatment process for removing hydrogen is performed after the first plating layer is formed.

For multilayer electronic component samples, 800 samples are prepared for each test number, and the first plating layer is adjusted to have a different average thickness by changing plating time for each test number. In 800 samples for each test number, 400 samples are completed by forming the first plating layer using the electrolytic plating, then performing the vacuum heat treatment thereon at the temperature of 180 to 250° C. for 24 hours (hereinafter referred to as "heat treatment according to the present disclosure"), and then forming the second and third plating layers; and the remaining 400 samples are completed by forming the first plating layer, and then forming the second and third plating layers, without performing the heat treatment according to the present disclosure. All the samples have substantially the same configuration except for the thickness of the first plating layer 132 and whether the heat treatment is performed according to the present disclosure. In detail, all the samples commonly include the body 110, the external electrodes 130 and 140, the first electrode layer 131, the second plating layer 133, and the oxide 134 including nickel (Ni), as in an exemplary embodiment of the present disclosure.

In the reliability evaluation, a case where a sample has a lower insulation resistance (IR) value by 10^7 or more from its initial value is determined as defective when the sample is tested under conditions of step 1 of 60° C., 1 Vr, and 2 Hr (here, 1 Vr=25V), step 2 of 60° C., 2 Vr, and 2 Hr, and step 3 of 85° C., 2 Vr, and 2 Hr.

TABLE 1

| | First plating layer | | Reliability deterioration (number of defects/number of samples) | |
|---|---|---|---|---|
| Test no. | Plating time (min.) | Average thickness (t1, μm) | Without heat treatment | With heat treatment |
| 1 | 5 | 0.4 | 5/400 | 0/400 |
| 2 | 15 | 0.9 | 4/400 | 0/400 |
| 3 | 30 | 1.49 | 14/400 | 13/400 |
| 4 | 60 | 2.31 | 18/400 | 15/400 |

Test nos. 1 and 2 are cases where the average thickness t1 of the first plating layer is 0.9 μm or less, and the reliability of the multilayer electronic component is improved when the heat treatment according to the present disclosure is performed thereon, and the improved reliability is seen to be caused by effectively removing hydrogen permeating into the body 110 or the electrode layer 131 when the heat treatment according to the present disclosure is performed.

Referring to Test nos. 3 and 4, the reliability improvement effect of the multilayer electronic component by the heat treatment according to the present disclosure is reduced when the average thickness t1 of the first plating layer is greater than 0.9 μm. The reduced reliability improvement effect is seen to occur because a proportion of the first plating layer is excessive in the total nickel (Ni) plating layer, and hydrogen permeating into the body 110 or the electrode layer 131 is thus absorbed by the first plating layer 132 without being externally released even when the heat treatment is performed thereon.

Therefore, the reliability improvement effect of the multilayer electronic component 100 by the heat treatment according to the present disclosure may be maximized when the average thickness t1 of the first plating layer is 0.9 μm or less, as in an exemplary embodiment of the present disclosure.

As set forth above, the present disclosure may provide the multilayer electronic component which may suppress the permeation of hydrogen into the internal electrode or the dielectric layer in the process of forming the plating layer on the external electrode.

The present disclosure may provide the multilayer electronic component which may secure its reliability by effectively removing hydrogen permeating into the internal electrode or the dielectric layer in the process of forming the plating layer on the external electrode.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:

a body including a dielectric layer and internal electrodes alternately positioned while having the dielectric layer interposed therebetween; and an external electrode positioned on the body, wherein the external electrode includes an electrode layer connected to one or more of the internal electrodes and including copper (Cu), a first plating layer positioned on the electrode layer and including nickel (Ni), and a second plating layer positioned on the first plating layer and including nickel (Ni), an oxide including nickel (Ni) is positioned on a boundary surface between the first plating layer and the second plating layer, an average thickness of the first plating layer is smaller than an average thickness of the second plating layer, and the oxide including nickel (Ni) includes at least one of NiO or $Ni_2O_3$.

2. The component of claim 1, wherein the oxide including nickel (Ni) has an island shape.

3. The component of claim 1, wherein the oxide including nickel (Ni) is positioned in a scattered point shape on the boundary surface between the first plating layer and the second plating layer.

4. The component of claim 1, wherein the first plating layer covers the electrode layer.

5. The component of claim 1, wherein a sum of the average thickness of the first plating layer and the average thickness of the second plating layer is 2 μm or more and 10 μm or less.

6. The component of claim 1, wherein the average thickness of the first plating layer is 0.1 μm or more and 0.9 μm or less.

7. The component of claim 1, wherein a ratio of the average thickness of the first plating layer to the average thickness of the second plating layer is 0.9 or less.

8. The component of claim 1, wherein the first or second plating layer includes a plurality of grains, and an average grain size of the plurality of grains included in the second plating layer is greater than the average grain size of the plurality of grains included in the first plating layer.

9. The component of claim 1, wherein the oxide including nickel (Ni) includes NiO.

10. The component of claim 1, wherein the electrode layer further includes glass.

11. The component of claim 1, wherein the external electrode further includes a third plating layer positioned on the second plating layer and including tin (Sn).

12. The component of claim 11, wherein the third plating layer covers the second plating layer.

13. The component of claim 11, wherein the third plating layer includes no opening.

14. The component of claim 1, wherein the electrode layer further includes thermosetting resin.

15. The component of claim 14, wherein the electrode layer further includes at least one of nickel (Ni), silver (Ag), tin (Sn), and chromium (Cr).

16. The component of claim 14, wherein the thermosetting resin includes at least one of phenolic resin, urea resin, diallylphthalate resin, melanin resin, guanamine resin, unsaturated polyester resin, polyurethane resin, epoxy resin, acrylic resin, ethyl cellulose resin, aminoalkyd resin, melamine-urea cocondensation resin, silicon resin, and polysiloxane resin.

17. A multilayer electronic component comprising:

a body including a dielectric layer and internal electrodes alternately positioned while having the dielectric layer interposed therebetween; and an external electrode positioned on the body, wherein the external electrode includes an electrode layer connected to one or more of the internal electrodes and including copper (Cu), a first plating layer positioned on the electrode layer and including nickel (Ni), and a second plating layer positioned on the first plating layer and including nickel (Ni), an oxide including nickel (Ni) is positioned on a boundary surface between the first plating layer and the second plating layer, an average thickness of the first plating layer is 0.9 μm or less, and the oxide including nickel (Ni) includes at least one of NiO or $Ni_2O_3$.

18. The component of claim 17, wherein the oxide including nickel (Ni) has an island shape.

19. The component of claim 17, wherein the oxide including nickel (Ni) is positioned in a scattered point shape on the boundary surface between the first plating layer and the second plating layer.

20. The component of claim 17, wherein a sum of an average thickness of the first plating layer and an average thickness of the second plating layer is 2 μm or more and 10 μm or less.

21. The component of claim 17, wherein the first and second plating layers include a plurality of nickel (Ni) grains.

22. The component of claim 21, wherein an average grain size of the plurality of nickel (Ni) grains included in the second plating layer is greater than the average grain size of the plurality of grains included in the first plating layer.

23. The component of claim 17, wherein the external electrode further includes a third plating layer positioned on the second plating layer and including tin (Sn).

24. The component of claim 17, wherein the average thickness of the first plating layer is 0.1 μm or more and 0.9 μm or less.

* * * * *